US006851116B1

(12) United States Patent
Yoshikawa (10) Patent No.: US 6,851,116 B1
(45) Date of Patent: Feb. 1, 2005

(54) SYSTEM FOR OPTIMALLY DISTRIBUTING PROCESSING PERFORMANCE OF AV APPARATUS

(75) Inventor: Masato Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/547,036

(22) Filed: Apr. 11, 2000

(30) Foreign Application Priority Data

Apr. 21, 1999 (JP) .......................................... 11-113140

(51) Int. Cl.$^7$ ............................................. G06F 13/10
(52) U.S. Cl. ..................................................... 719/322
(58) Field of Search ................................ 719/321–327; 709/310–332, 223–226

(56) References Cited

U.S. PATENT DOCUMENTS

| | | | | |
|---|---|---|---|---|
| 5,428,730 A | * | 6/1995 | Baker et al. ................. | 345/740 |
| 5,440,740 A | * | 8/1995 | Chen et al. ................. | 709/104 |
| 5,442,789 A | * | 8/1995 | Baker et al. ................. | 709/105 |
| 5,598,278 A | * | 1/1997 | Tanaka et al. ................. | 386/96 |
| 5,838,683 A | * | 11/1998 | Corley et al. ............... | 370/408 |
| 5,887,193 A | * | 3/1999 | Takahashi et al. ............. | 710/8 |
| 6,044,408 A | * | 3/2000 | Engstrom et al. ........... | 709/328 |
| 6,052,750 A | * | 4/2000 | Lea .............................. | 710/72 |
| 6,078,942 A | * | 6/2000 | Eisler et al. ................. | 709/100 |
| 6,353,862 B1 | * | 3/2002 | Hamilton .................... | 709/323 |
| 6,449,514 B1 | * | 9/2002 | Natsubori et al. ............ | 700/19 |
| 6,484,199 B2 | * | 11/2002 | Eyal ............................ | 709/223 |
| 6,618,750 B1 | * | 9/2003 | Staats ......................... | 709/209 |

FOREIGN PATENT DOCUMENTS

WO    PCT WO99/07114    2/1999

OTHER PUBLICATIONS

Hase, Tomohiro et al. "A New Audio–Visual Control Using Message Object Tranmission." IEEE. Nov. 1994.*

* cited by examiner

Primary Examiner—Lewis A. Bullock, Jr.
(74) Attorney, Agent, or Firm—Whitham, Curtis & Christofferson, P.C.

(57) ABSTRACT

To provide a system which is capable of automatically selecting an optimum function from a plurality of connected AV apparatus and of constructing an optimum utilization. An audio-video managing system comprises a plurality of audio-video apparatus ("AV apparatus") and a managing apparatus which is connected with said plurality of AV apparatus. The managing apparatus comprises means for receiving AV apparatus information including information on functions of said AV apparatus and ranks of said functions, which is transmitted from said plurality of AV apparatus and for detecting duplicated functions existing among said plurality of AV apparatus, and means for determining allocation so that the duplicated function is allocated to the AV apparatus having a highest rank and optimum functions are allocated to each of said plurality of AV apparatus based upon the rank information of said function when presence of duplicated functions among said plurality of AV apparatus functions is detected.

19 Claims, 5 Drawing Sheets

AV APPARATUS INFORMATION

| AV APPARATUS ID | FUNCTION | RANK (1) | FUNCTION | RANK (1) | ------- |

SYSTEM FOR OPTIMALLY DISTRIBUTING PROCESSING PERFORMANCE OF AV APPARATUS

FIELD OF THE INVENTION

The present invention relates to a system for managing audio video apparatus and in particular to a system for optimizing functions of a plurality of audio-video apparatus.

BACKGROUND OF THE INVENTION

Recently, apparatus for decoding and reproducing compressed and encoded digital contents such as audio and video signals or for reproducing analog audio and video signals have been diversified. Information processing devices are incorporated in various audio-video apparatus. Systems which connect these audio-video apparatus (hereinafter referred to as "AV apparatus") with personal computers and the like have been practically used. In association with the advance and development of multimedia technology, various personal computers in which AV apparatus is incorporated or various personal computers which are connected with AV apparatus via an interface have been put on the market.

In the prior art system for managing the AV apparatus, transfer of control driver software is conducted, for example, when the AV apparatus is connected with a managing apparatus.

SUMMARY OF THE DISCLOSURE

However, certain problems have been encountered in the course of investigations toward the present invention. Namely, although transfer of control driver software is conducted in the above-mentioned prior art AV apparatus-managing system, for example, when the AV apparatus is connected with the managing apparatus, the managing apparatus does not control the function of each AV apparatus. Therefore, there is a problem that the managing apparatus is not capable of establishing an optimum utilization mode, allocating functions and concentrating the processing performance in a case where functions are duplicated among the connected AV apparatus.

The "Universal Plug and Play" format which has been recently defined by Microsoft Corporation uses an internet standard technology to connect the computers with peripheral devices and domestic appliances via a network to construct a mutually usable environment.

In this Universal Plug and Play format, only specifications up to establishment of an network by connection are prescribed. The specifications do not define lower layers such as transfer of a driver from one AV apparatus to another AV apparatus and optimized distribution function such as distribution of processing which is divided when a plurality of functions are duplicated.

If such an optimized distribution function is provided, more effective utilization manner can be implemented in, for example, "Universal Plug and Play network".

Figure 5:
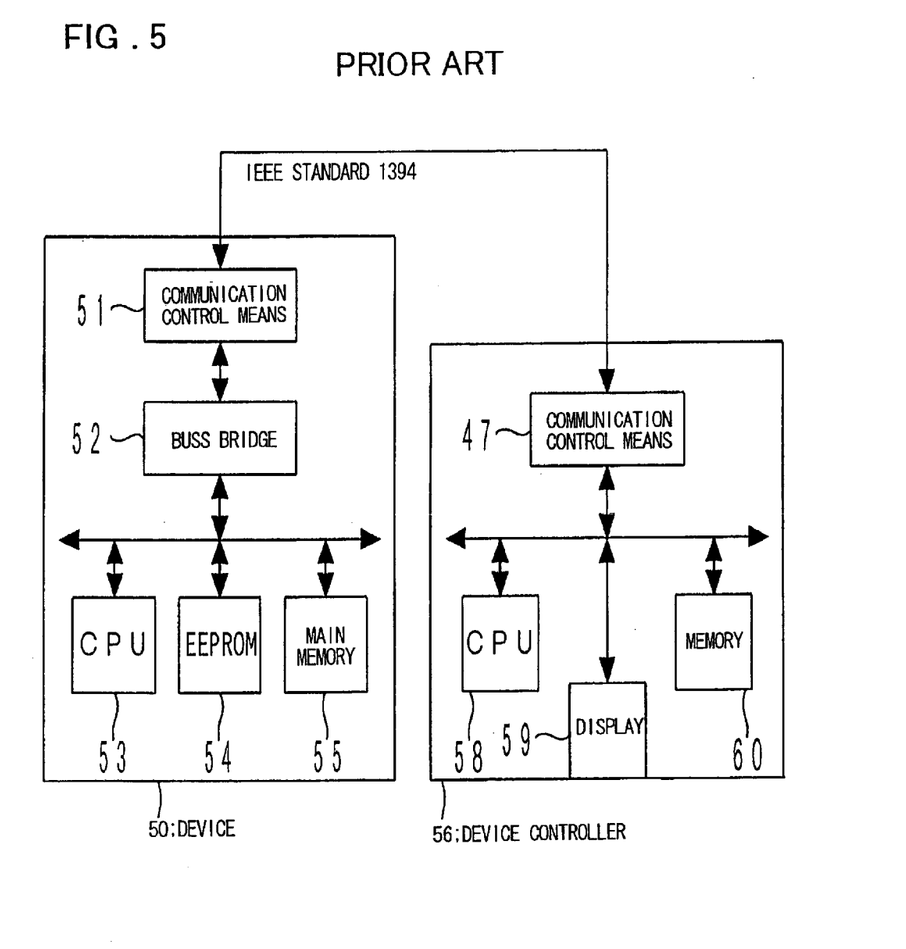
FIG. 5 A diagram showing the structure of a data telecommunication system disclosed in Japanese Patent Kokai Publication JP-A-10-214243.

As a technique for transferring and controlling a driver-software suitable for the devices, which is different in the technical field from the system for managing the AV apparatus, a data telecommunication system which is shown in FIG. 5 is disclosed in, for example, Japanese Patent Kokai Publication JP-A-10-214243. In this data telecommunication system, device (printer, digital video camera) 50 is connected with a device controller 56 for controlling the device 50 by communication control means 47 and 51, respectively, which conduct communication via an IEEE 1394 cable. The device controller 56 determines whether or not a driver software which is suitable for controlling the device 50 is stored. If stored, the driver software is transmitted to a device controller 56, which controls the device 50 based upon the transmitted driver software. However, if the data telecommunication system which is described in the above-cited Publication is applied to a controller which controls the AV apparatus, the driver software which is possessed by each AV apparatus is transferred to the device controller, so that the device controller only controls the AV apparatus by the transfer driver software.

Accordingly, the present invention has been achieved in view of the above-mentioned problems. It is an object of the present invention to provide a system which is capable of formulating an optimum utilization mode by automatically selecting an optimum function from a plurality of connected AV apparatus.

According to an aspect of the present invention, there is provided an audio-video managing system comprising a plurality of audio-video apparatus, hereinafter referred to as AV apparatus, and a managing apparatus which is connected with the plurality of AV apparatus.

The managing apparatus comprises: means for receiving AV apparatus information including information on functions of the AV apparatus and ranks of the functions, which is transmitted from the plurality of AV apparatus and for detecting duplicated functions existing among the plurality of AV apparatus; and means for determining allocation so that the duplicated function is allocated to an AV apparatus having a highest rank and optimum functions are allocated to each of the plurality of AV apparatus based upon the information on the rank of the function when the presence of duplicated functions among the plurality of AV apparatus functions is detected.

In a second aspect of the present invention, each of the AV apparatus transmits control drivers of the functions which are determined by the managing apparatus to each of the managing apparatus, the managing apparatus comprises receiving (communication) unit for receiving the control drivers of the functions which are transmitted from each of the AV apparatus to store and hold the control drivers and for transmitting the control drivers of the functions to any other AV apparatus which does not have these functions.

In a third aspect of the present invention, the AV apparatus information comprises information of identification of its own AV apparatus, a number of sets of information on the functions and ranks, which number is equal to the number of functions which are possessed by its own AV apparatus, and in that the AV apparatus transmits the AV apparatus information to the managing apparatus when the AV apparatus is connected to the managing apparatus.

In a fourth aspect of the present invention, the managing apparatus comprises an input unit inputting information which is specified by a user so that presetting of the connection mode and function allocation of the AV apparatus is rendered possible as specified by the user.

In a fifth aspect of the present invention, at least one of the plural ity of AV apparatus comprises the managing apparatus.

In a sixth aspect of the present invention, the system is connected with an apparatus transferring data of plurality of channels so that data on each of the channels is reproduced by respective different AV apparatus.

In a seventh aspect of the present invention, the system further comprises a selecting module (or step) selecting an AV apparatus which performs the function in a predetermined selecting format when a plurality of AV apparatus have a same rank for a same function.

In an eighth aspect of the present invention, there is provided an AV apparatus managing system comprising one or more audio-video apparatus, hereinafter referred to as AV apparatus, and a plurality of information processing apparatus being connected to one or more of the AV apparatus and having functions outputting audio and/or video signals, and wherein the AV apparatus selects the information processing apparatus having a highest rank function based upon rank information of the functions possessed by this AV apparatus to transmit a control driver of the highest rank function to the selected information processing apparatus.

In a ninth aspect of the present invention, the managing apparatus comprises: a managing module receiving AV apparatus information including information on functions of the AV apparatus and ranks of the functions, which is transmitted from the plurality of AV apparatus, the managing module detecting duplicated functions existing among the plurality of AV apparatus; and an allocating module determining allocation so that the duplicated function is allocated to an AV apparatus having a highest rank and optimum functions are allocated to each of the plurality of AV apparatus based upon the information on the rank of the function when the presence of duplicated functions among the plurality of AV apparatus functions is detected.

PREFERRED EMBODIMENTS OF THE INVENTION

The present invention provides functions and means for optimally distributing decoding, encoding, recording and reproducing functions among a plurality of AV apparatus which are connected with each other via a network which is built in home, such as IEEE 1394, HomeRun, HomeRF. Ethernet. In accordance with the present invention, it is possible to implement the duplicated above-mentioned functions on an optimum AV apparatus and to perform the function in an optimum manner or state. And, it is possible to improve the processing performance by distributing the functions to concentrate in a single function from the various functions of each AV apparatus.

If the connected AV apparatus has a plural ity of functions, the AV apparatus are controlled for each of the functions to achieve an enhancement in output quality.

In the present invention, manual setup by an user is not necessary to automatically achieve an optimum connection mode. Malfunction due to inappropriate manual setup can be reduced, too.

Figure 1:
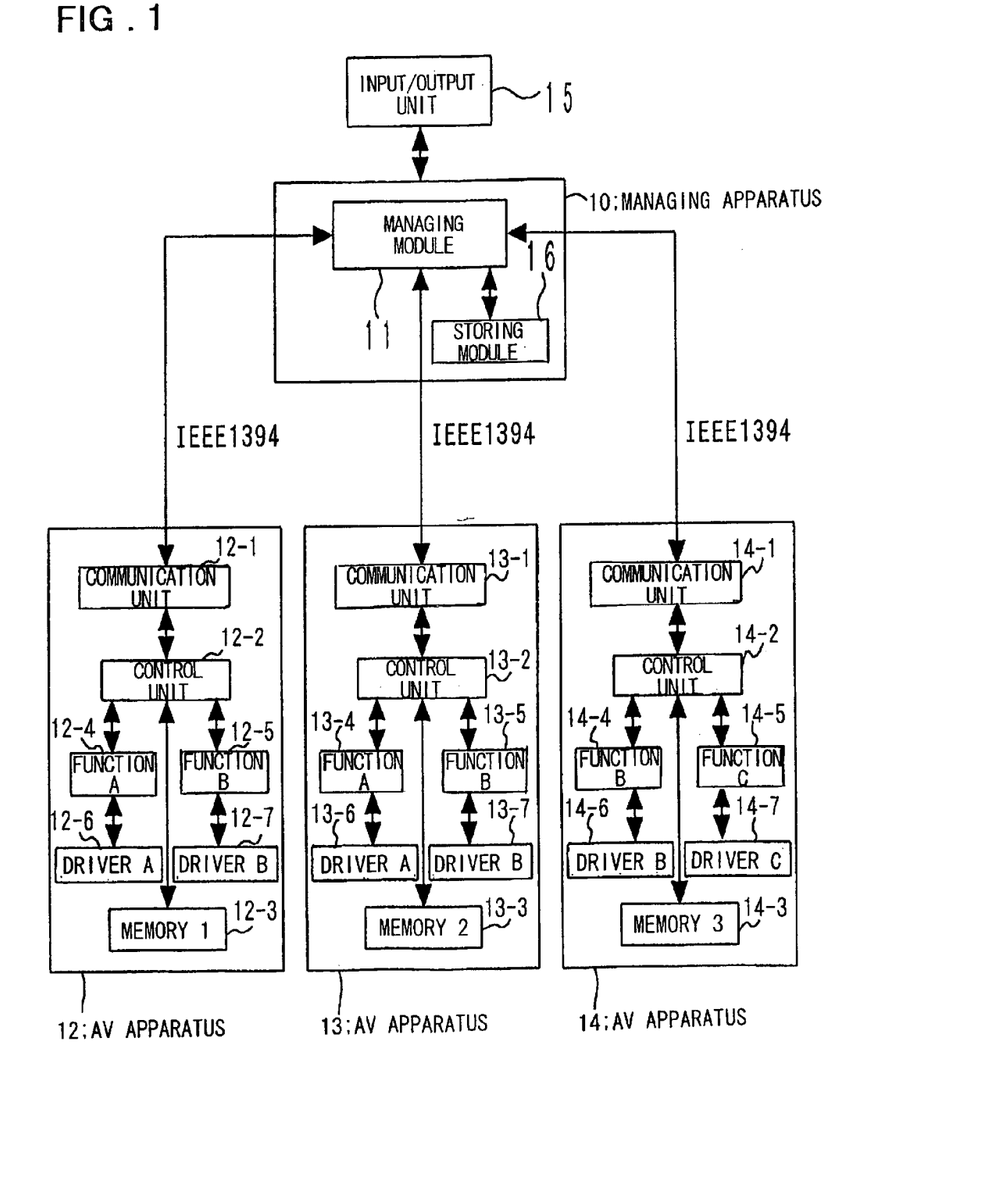
FIG. 1 A diagram showing the structure of one embodiment of the present invention.

FIG. 1 is a diagram showing the structure of one embodiment of the present invention. Referring now to FIG. 1, a plurality of AV apparatus 12, 13, 14 are connected to a managing apparatus 10 including a managing module 11 and storing module 16. The managing apparatus 10 confirms the functions which are possessed by each AV apparatus based upon information which is received from AV apparatus 12, 13, 14. If the functions are duplicated among AV apparatus, the managing module 11 presets the rank of each function among AV apparatus based upon information received from the AV apparatus 12, 13, 14.

The rank of function is preset for the information transferred from AV apparatus. For example, the function is ranked with a number. The managing module 10 presets the rank by comparing the numbers.

After the presetting of the rank is completed, the managing module 11 notifies respective AV apparatus to transfer an apparatus control driver which is necessary for the function to be used.

In response to this notification, the AV apparatus 12, 13 14 sequentially transfer AV apparatus control drivers (control driver software, hereinafter simply referred to "driver") to managing module 11 of managing apparatus 10.

The managing module 11 holds the drivers transferred from the AV apparatus in storing module 16 and transfers the drivers to respective apparatus to prevent the drivers from being duplicated.

The AV apparatus 12, 13, 14 which have received the drivers transferred from the managing module 11 holds the received drivers and refer them when it uses the functions which are possessed by the other AV apparatus.

EXAMPLES

The examples of the present invention will be described with reference to the drawings. FIG. 1 shows the structure of one example of the present invention. Referring now to FIG. 1, the managing apparatus 10 comprises managing module 11 for managing the connected apparatus, storing module 16 for holding drivers and the like and input/output unit 15. The AV apparatus 12, 13 and 14 comprises communication unit (12-1, 13-1, 14-1), control unit (12-2, 13-2, 14-2), one or plural functions (function units) (12-4, 12-5, 13-4, 13-5, 14-4, 14-5) and drivers (12-6, 12-7, 13-6, 13-7, 14-6, 14-7) corresponding to the functions. The AV apparatus further comprise memories (12-3, 13-3, 14-3) for storing the drivers of the other AV apparatus transferred from the managing apparatus 10.

In the example shown in FIG. 1, the AV apparatus may be a television (TV) receiver, or stereo amplifiers, which are connected with the managing apparatus comprising a personal computer via an interface such as IEEE 1394 to form a topology. The AV apparatus may comprise managing apparatus.

The managing apparatus 10 is provided with an input/output unit 15 to enable the user to preset and control the AV apparatus.

Figure 2:
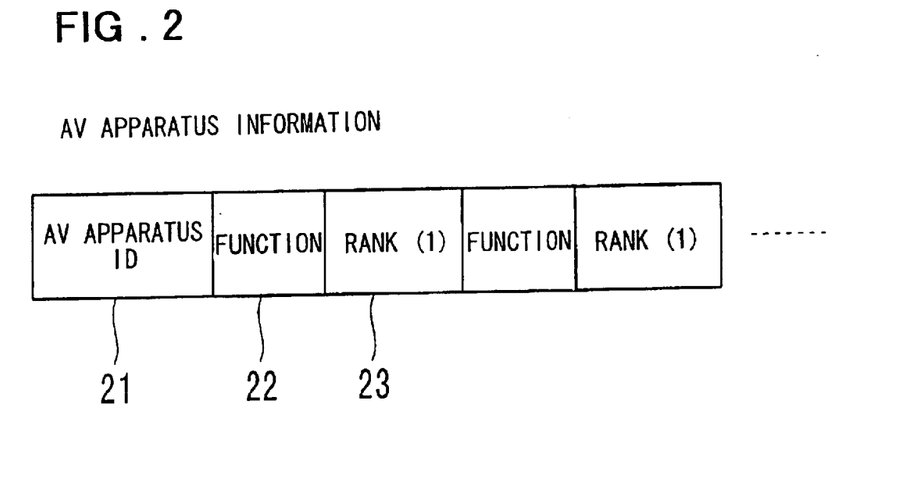
FIG. 2 A diagram showing an exemplary format of AV apparatus information in one embodiment of the present invention.

FIG. 2 is a view showing an exemplary data format of the information which is transferred from the AV apparatus to the managing apparatus 10 for identifying the AV apparatus (hereinafter referred to as AV apparatus information). The AV apparatus information includes information on the function (or functions) which is possessed by the AV apparatus and the information on the rank of the function. Referring now to FIG. 2, the AV apparatus information comprises information items (or frames) of AV apparatus ID 21, function 22 and rank 23. If the AV apparatus in interest has a plurality of functions, a corresponding plurality of sets of function information and rank information are stored as shown in FIG. 2.

The managing apparatus 10 establishes an optimum apparatus utilizing mode by using the information data which is transferred from the AV apparatus. If there is a problem in use of the function of the AV apparatus which is being used, or the functions to be used in the AV apparatus are duplicated, the apparatus utilizing mode is reconstructed by transferring this information, so that another AV apparatus having the similar function may alternatively perform the function.

Referring now to FIGS. 1 and 2, operation of one example of the present invention will be described.

When the managing apparatus 10 obtains the information of each AV apparatus (AV apparatus information shown in FIG. 2) which is transferred from the AV apparatus 12, 13, 14, it analyzes the contents of the information to confirm the function (or functions) 22 which is (are) possessed by each AV apparatus. The managing module 11 detects the presence of the functions 22 which are duplicated among AV apparatus, if any. In other words, the managing module 11 detects the doubling of the functions by checking whether or not there are identical functions contained in the AV apparatus information transferred from the AV apparatus 12, 13, 14.

In the AV apparatus information, the rank of functions which is preset according to the functions 22 has the highest rank which is 1. The next higher ranks are 2, 3, 4 and so on. The ranks are lowered according to the higher numbers. When the connected AV apparatus have duplicated functions, which function is to be used is determined according to the rank information 23. For example, it is assumed that the first and second AV apparatus 12 and 13 have similar functions A and B, respectively, and the third AV apparatus 14 has functions B and C. It is also assumed that the ranks of functions A and B are 1 and 3, respectively in the first AV apparatus, the ranks of functions A and B are 2 and 1, respectively in the second AV apparatus 13, and the ranks of functions B and C are 2 and 1, respectively in the third AV apparatus 14.

The managing module 11 collates the ranks of functions in the AV apparatus based upon the AV apparatus information transferred from the AV apparatus 12, 13 and 14 and determines as follows. The first AV apparatus 12 is used for the function A.

The second AV apparatus 13 is used for the function B.

The third AV apparatus 14 is used for the function C since there is no duplicated function in the other AV apparatus.

When the allocation of the functions for the AV apparatus is determined, the managing module 11 notifies the first, second and third AV apparatus 12. 13 and 14 to transfer the drivers A, B and C of functions A, B and C, respectively.

The first, second and third AV apparatus 12, 13, 14 transfers the drivers A, B, C to respective managing apparatus 10 in response to the notification from the managing module 11.

The drivers A, B, C which is are transferred to the managing apparatus 10 is stored in the storing module 16 of the managing apparatus. The managing module 111 transfer:

the driver A of function A to the second and third AV apparatus 13 and 14, respectively, the driver B of the function B to the first and third AV apparatus 12 and 14, respectively, and the driver C of the function C to the first and second AV apparatus 12 and 13, respectively.

This makes it possible to control the other AV apparatus from each AV apparatus. For example, control for switching of turning on or off of the power, or replay, fast forward, reverse and stop of the other AV apparatus is conducted.

If the rank is equal to that of the function of the other AV apparatus, the function of the firstly connected AV apparatus may be used on a priority basis.

The managing apparatus 10 inquires the user which AV apparatus is to be used via the input/output unit 15. The user determines the AV apparatus to be used and may preset and input the determined information from the input/output unit 15.

The first to third AV apparatus 12, 13, and 14 may be, for example, DVD-ROM, TV receiver and stereo amplifier. The functions A, B and C may be decoding function of NTSC video signal, audio decode function and optical output function. The DVD-ROM does not directly decode video signal, but decodes the output video data is decoded by the video decode function of the TV for displaying it.

Since the stereo amplifier has a rank which is higher than that of TV receiver in the audio apparatus, the audio data may be decoded for reproduction in the stereo amplifier, or alternatively it may be converted into optical signals from an optical output unit.

In a case where the apparatus which transfer multi-channeled data are connected and AV apparatus having similar functions for decoding said data are connected, the functions of both AV apparatus can be used. If all the AV apparatus are connected in this case, the first and second AV apparatus 12 and 13 detect that the third AV apparatus 14 is an apparatus for transferring the multi-channeled data.

If the first and second AV apparatus 12 and 13 have functions of audio-and video decode A and B, the first AV apparatus 12 transfers the drivers of functions A and B to the second and third AV apparatus 13 and 14.

The second AV apparatus 13 transfers the drivers of the functions A and B to the first and third AV apparatus 12 and 14, respectively.

When the multi-channeled data is output from the third AV apparatus 14, the first and second AV apparatus 12 and 13 receive the data and decode the data on the channel which is specified by the user, respectively.

This function enables the first and second AV apparatus 12 and 13 to display respective different channels. As mentioned above. the connection mode may be freely determined by each of the AV apparatus on initial presetting to decode the multi-channeled data, or alternatively the connection mode can be freely preset by means of input/output unit 15 by the user.

Figure 3:
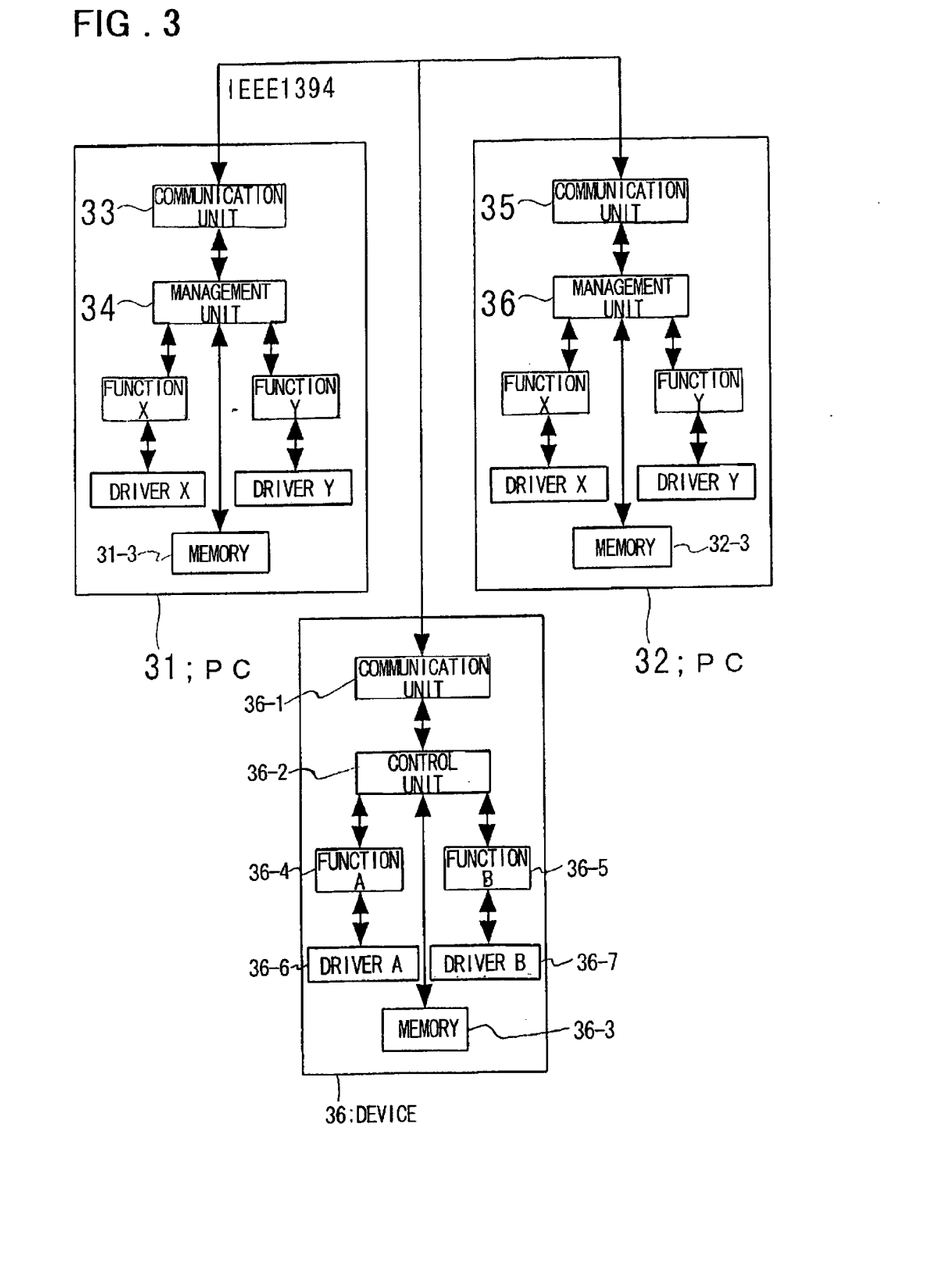
FIG. 3 A diagram showing the structure of another embodiment of the present invention.

A second example of the present invention will be described. FIG. 3 is a diagram showing the structure of the second example of the present invention.

Referring now to FIG. 3, a first PC (personal computer) 31, a second PC 32 and an AV apparatus (device) 36 are connected to each other via an IEEE 1394 interface. Each of PC 31 and 32 recognizes the functions which are possessed by the other PCs and AV apparatus 36 based upon transmission and reception of packets. The AV apparatus 36 comprises communication unit 36-1, managing unit (control unit) 36-2, a plural ity of functions A and B (36-4, 36-5). drivers 36-6 and 36-7 corresponding to the functions and a memory 36-3.

It is assumed that the function A is a function for decoding and outputting compressed audio data, and function B is a function for decoding and outputting compressed video data.

If it is detected that the first PC 31 has a higher function (higher rank) based upon the rank information for decoding of the compressed audio data and audio reproducing and it is determined that the second PC has a higher function based upon the rank information of decoding for compressed video data and video reproducing, the AV apparatus 36 transfers the driver A of the function A to the first PC 31 and the driver B of the function B to the second PC 32.

The transferred drivers of the functions A and B are stored in the memories 31-3 and 32-3 of the first and second PCs 31 and 32, respectively.

The first PC 31 obtains only audio data from the AV apparatus 36. The second PC 32 obtains only video data from the AV apparatus 36.

The first PC 31 decodes audio data for audio reproduction and the second PC 32 decodes video data for video reproduction.

In such a manner, optimum audio and video reproduction is made possible and further the processing performance of each PC 31 and 32 can be concentrated.

Figure 4:
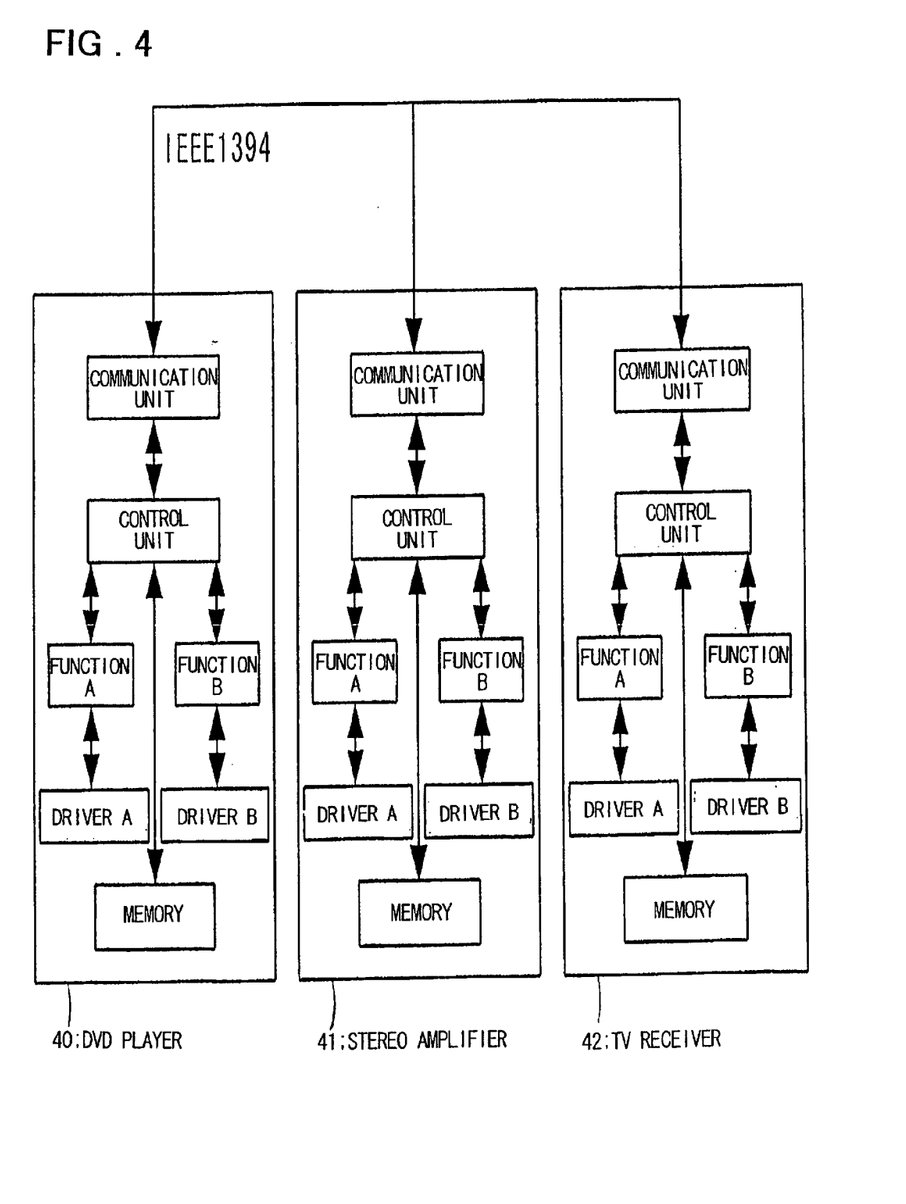
FIG. 4 A diagram showing details of one embodiment of the present invention.

FIG. 4 is a diagram showing the details of one example of the present invention. In the connection manner shown in FIG. 4, a TV receiver 42 incorporates a decoder for video data and audio data. A stereo amplifier 41 incorporates a decoder for audio data. A DVD player 40 has a function for independently outputting compressed video and audio data. At the time when they are connected, only the video decoder of the TV 42 is a sole function in this connection manner. Accordingly, this function of the TV 42 is utilized as the video decoder Although the TV 42 and the stereo amplifier 41 have the same function of audio decoding, the stereo amplifier 41 has a higher rank. Accordingly, the audio decoder of the stereo amplifier 41 is used.

Since the functions for decoding and outputting of the compressed and encoded audio and video data of the DVD player 40 is not possessed by the other AV apparatus, these both functions are used at the DVD player 40.

The DVD player 40 transfers the driver to be used for the audio function to the stereo amplifier 41. The DVD player 40 transfers the driver to be used for the video function to the TV receiver 42.

The stereo amplifier 41 transfers the driver to be used for the audio function to the TV 42 and the DVD player 40. The TV receiver 42 transfers the driver to be used for the video function to the DVD player 40 and the stereo amplifier 41.

The audio data is transferred from the DVD player 40 to the stereo amplifier 41. The stereo amplifier 41 which receives this data decodes the audio data for audio reproduction.

The DVD player 40 transfers the video data to the TV 42. The TV receiver 42 receives the video data for decoding it to conduct video reproduction.

The kinds and the number of the AV apparatus which have been described in the foregoing embodiment is only exemplary for the explanation. The present invention is not limited to the above-mentioned AV apparatus, the number of the AV apparatus and connection manner.

The meritorious effects of the present invention are summarized as follows.

As mentioned above, the present invention provides the advantages as follows.

A first advantage of the present invention resides in that an optimum function can be automatically selected from a plurality of connected AV apparatus so that an optimum utilization mode can be constructed.

The reason is that when the plurality of connected AV apparatus has similar functions, only the driver of the optimum function is transferred so that its function will be used in accordance with the present invention.

A second advantage of the present invention resides in that an enhancement of the output quality can be achieved.

The reason is that the processing performance is concentrated to only one function of one AV apparatus which is selected from the plurality of connected AV apparatus.

A third advantage of the present invention resides in that occurrence of malfunction when a plurality of AV apparatus are connected.

The reason is that an optimum connection manner is automatically preset so that necessity of manual presetting by the user is not necessary, and malfunction due to inappropriate manual presetting does not take place.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An audio-video managing system wherein said system comprises a plurality of audio-video apparatus, hereinafter referred to as AV apparatus, and a managing apparatus which is connected with said plurality of AV apparatus; and wherein said managing apparatus comprises:

means for receiving AV apparatus information including information on functions of said AV apparatus and ranks of said functions, which is transmitted from said plurality of AV apparatus and for detecting duplicated functions existing among said plurality of AV apparatus; and means for determining allocation so that the duplicated function is allocated to an AV apparatus having a highest rank and optimum functions are allocated to each of said plurality of AV apparatus based upon the information on the rank of said function when the presence of duplicated functions among said plurality of AV apparatus functions is detected so that control of said duplicated functions is handled by a single command issued from said managing apparatus.

2. An AV apparatus managing system as defined in claim 1, wherein each of said AV apparatus transmits control drivers of the functions which are determined by said managing apparatus to each of said managing apparatus, said managing apparatus comprises means for receiving the control drivers of said functions which are transmitted from each of said AV apparatus to store and hold said control drivers and for transmitting said control drivers of said functions to any other AV apparatus which does not have said functions.

3. An AV apparatus managing system as defined in claim 2, wherein said system further comprises at least one information processing apparatus which comprises said managing apparatus.

4. An AV apparatus managing system as defined in claim 3, wherein said computer comprises at least one function unit which performs at least one function selected for at least one of the AV apparatus.

5. An AV apparatus managing system as defined in claim 1, wherein said AV apparatus information comprises information of identification of its own AV apparatus, a number of sets of information on the functions and ranks, which number is equal to the number of function which possessed by its own AV apparatus and in that said apparatus transmits said AV apparatus information to said managing apparatus when said AV apparatus is connected to said managing apparatus.

6. An AV Apparatus managing system as defined in claim 1, wherein said managing apparatus comprises means for inputting information which is specified by a user so that presetting of the connection mode and function allocation of said AV apparatus is rendered possible by the specification of said user.

7. An AV apparatus managing system as defined in claim 1, wherein at least one of said plurality of AV apparatus comprises said managing apparatus.

8. An AV apparatus managing system as defined in claim 1, wherein said system is connected with an apparatus transferring data of plurality of channels so that data on each of said channels is reproduced by respective different AV apparatus.

9. An AV apparatus managing system as defined in claim 1, wherein said system further comprises means for selecting an AV apparatus which performs said function in a predetermined selecting format when a plurality of AV apparatus have a same rank for a same function.

10. An AV apparatus managing system as defined in claim 1, wherein said system further comprises at least one information processing apparatus which comprises said managing apparatus, said processing apparatus being connected to one or more of said AV apparatus and having functions outputting audio and/or video signals.

11. An AV apparatus managing system as defined in claim 10, wherein said AV apparatus selects said information processing apparatus having a highest rank function based upon rank information of the functions possessed by this AV apparatus to transmit a control driver of said highest rank function to said selected information processing apparatus.

12. An AV apparatus managing system, wherein said system comprises one or more audio-video apparatus, hereinafter referred to as AV apparatus, and a plurality of information processing apparatus being connected to one or more of said AV apparatus and having functions outputting audio and/or video signals, and wherein said AV apparatus selects the information processing apparatus having a highest rank function based upon rank information of the functions possessed by this AV apparatus to transmit a control driver of said highest rank function to said selected information processing apparatus.

13. An audio-video managing system wherein said system comprises a plurality of audio-video apparatus, hereinafter referred to as AV apparatus, and a managing apparatus which is connected with said plurality of AV apparatus; and wherein said managing apparatus comprises:

a managing module receiving AV apparatus information including information on functions of said AV apparatus and ranks of said functions, which is transmitted from said plurality of AV apparatus, said managing module detecting duplicated functions existing among said plurality of AV apparatus; and an allocating module determining allocation so that the duplicated function is allocated to an AV apparatus having a highest rank and optimum functions are allocated to each of said plurality of AV apparatus based upon the information on the rank of said function when the presence of duplicated functions among said plurality of AV apparatus functions is detected so that control of said duplicated functions is handled by a single command issued from said managing apparatus.

14. An AV apparatus managing system as defined in claim 13, wherein each of said AV apparatus comprises a communication unit transmitting control drivers of the functions which are determined by said managing apparatus to each of said managing apparatus, said managing apparatus comprises a communication unit receiving the control drivers of said functions which are transmitted from each of said AV apparatus to store and hold said control drivers, said communication unit transmitting said control drivers of said functions to any other AV apparatus which does not have said functions.

15. An AV apparatus managing system as defined in claim 13, wherein said AV apparatus information comprises information of identification of its own AV apparatus, a number of sets of information on the functions and ranks, which number is equal to the number of functions which are possessed by its own AV apparatus, and in that said AV apparatus transmits said AV apparatus information to said managing apparatus when said AV apparatus is connected to said managing apparatus.

16. An AV apparatus managing system as defined in claim 13, wherein said managing apparatus comprises an input unit inputting information which is specified by a user so that presetting of the connection mode and function allocation of said AV apparatus is rendered possible by the specification of said user.

17. An AV apparatus managing system as defined in claim 13, wherein at least one of said plurality of AV apparatus comprises said managing apparatus.

18. An AV apparatus managing system as defined in claim 13, wherein said system is connected with an apparatus transferring data of plurality of channels so that data on each of said channels is reproduced by respective different AV apparatus.

19. An AV apparatus managing system as defined in claim 13, wherein said system further comprises a selecting module selecting an AV apparatus which performs said function in a predetermined selecting format when a plurality of AV apparatus have a same rank for a same function.

* * * * *